(12) United States Patent
Bell et al.

(10) Patent No.: US 6,824,868 B2
(45) Date of Patent: Nov. 30, 2004

(54) DIGITAL COLOR-DESIGN COMPOSITE FOR USE IN LAMINATED GLASS

(75) Inventors: William Paul Bell, East Longmeadow, MA (US); James R. Moran, Longmeadow, MA (US); Vincent J. Yacovone, Springfield, MA (US)

(73) Assignee: Solutia, Inc., St. Louis, MO (US)

( * ) Notice: Subject to any disclaimer, the term of this patent is extended or adjusted under 35 U.S.C. 154(b) by 0 days.

(21) Appl. No.: 10/135,417

(22) Filed: Apr. 30, 2002

(65) Prior Publication Data

US 2003/0203214 A1 Oct. 30, 2003

(51) Int. Cl.$^7$ .............. B32B 7/12; B32B 17/00; B32B 17/10; B32B 27/00; B32B 27/04

(52) U.S. Cl. .............. 428/343; 428/428; 428/441; 428/436; 428/542.2; 428/480; 428/474.4; 428/426; 428/13; 428/29; 428/213; 428/220; 428/335; 428/437; 428/346; 428/354; 428/355 AK; 428/335 AC (58) Field of Search .............. 428/13, 29, 157, 428/220, 213, 335, 426, 428, 436, 437, 441, 442, 412, 413, 542.2, 480, 474.4, 343, 346, 354, 355 AK, 355 AC (56) References Cited

U.S. PATENT DOCUMENTS

| | | | |
|---|---|---|---|
| 4,173,672 A | 11/1979 | Mannheim | 428/203 |
| 4,244,997 A | 1/1981 | Postupack | 428/174 |
| 4,255,490 A | 3/1981 | Katsura | 428/483 |
| 4,278,736 A | 7/1981 | Kamerling | 428/437 |
| 4,379,805 A | 4/1983 | Downing et al. | 428/346 |
| 4,444,825 A | 4/1984 | Vanderstukken et al. | 428/215 |
| 4,469,743 A | 9/1984 | Hiss | 428/215 |
| 4,480,003 A | 10/1984 | Edwards et al. | 428/329 |
| 4,537,828 A | 8/1985 | Gomez | 428/412 |
| 4,574,136 A | 3/1986 | Gomez | 524/310 |
| 4,642,255 A | 2/1987 | Dlubak | 428/38 |
| 4,824,722 A | 4/1989 | Jarrett | 428/430 |
| 4,842,389 A | 6/1989 | Wood et al. | 350/3.7 |
| 4,847,237 A | 7/1989 | Vanderzanden | 503/227 |
| 4,873,137 A | 10/1989 | Deyrup | 428/216 |
| 4,902,670 A | 2/1990 | Kanto et al. | 503/227 |
| 4,925,713 A | 5/1990 | Kiryu et al. | 428/40 |
| 4,952,457 A | 8/1990 | Cartier et al. | 428/425.6 |
| 4,968,533 A | 11/1990 | Gsell | 428/203 |
| 4,971,845 A | 11/1990 | Aaker et al. | 428/34.9 |
| 4,975,332 A | 12/1990 | Sjini et al. | 428/500 |
| 4,976,795 A | 12/1990 | Perotto | 149/19.4 |
| 4,976,799 A | 12/1990 | Wood | 156/106 |
| 4,999,266 A | * 3/1991 | Platzer et al. | 430/14 |

(List continued on next page.)

FOREIGN PATENT DOCUMENTS

| | | | |
|---|---|---|---|
| DE | 19705586 C1 | 4/1998 | C03C/27/12 |
| DE | 20100717 U1 | 5/2001 | B32B/17/10 |
| EP | 0849092 A1 | 6/1998 | B41M/7/00 |
| EP | 1129844 A1 | 9/2001 | B32B/17/10 |

OTHER PUBLICATIONS

PCT Publication No. WO 02/18154 A1 for International Patent Application No. PCT/AU01/01106, dated Mar. 7, 2002.

PCT International Search Report for International Patent Application No. PCT/US03/13236 (cited references listed above). (Dec. 2003).

Primary Examiner—Michael La Ville
(74) Attorney, Agent, or Firm—Howrey Simon Arnold & White LLP (57) ABSTRACT

This invention is directed to a plastic composite comprising color images printed onto a polyethylene terephthalate (PET) substrate using thermal transfer (TT) printing technology. The PET layer is then bonded to a second PET layer using a thermally activated adhesive, preferably ethylene vinyl acetate copolymer (EVA). The bonded PET layers are then disposed between two layers of plasticized PVB, forming the plastic composite. The plastic composite can then be placed between two sheets of glass forming the final laminated glass product.

46 Claims, 3 Drawing Sheets

U.S. PATENT DOCUMENTS

| | | | |
|---|---|---|---|
| 5,010,672 A | 4/1991 | Coleman | 40/615 |
| 5,024,895 A | 6/1991 | Kavanagh et al. | 428/437 |
| 5,049,433 A | 9/1991 | Leotta | 428/195 |
| 5,066,525 A | 11/1991 | Nakamachi et al. | 428/29 |
| 5,069,962 A | 12/1991 | Okazaki et al. | 428/323 |
| 5,082,738 A | 1/1992 | Swofford | 428/437 |
| 5,089,318 A | 2/1992 | Shetty et al. | 428/212 |
| 5,091,258 A | 2/1992 | Moran | 428/437 |
| 5,153,062 A | 10/1992 | Grolig et al. | 428/336 |
| 5,169,694 A | 12/1992 | Endo et al. | 428/34 |
| 5,208,080 A | 5/1993 | Gajewski et al. | 428/1 |
| 5,209,972 A | 5/1993 | Super et al. | 428/349 |
| 5,229,217 A | 7/1993 | Holzer | 428/503 |
| 5,252,533 A | 10/1993 | Yasuda et al. | 503/227 |
| 5,397,635 A | 3/1995 | Wood, Jr. | 428/314.4 |
| 5,418,026 A | 5/1995 | Dronzek, Jr. et al. | 428/40 |
| 5,443,869 A | 8/1995 | Harris | 428/13 |
| 5,451,449 A | 9/1995 | Shetty et al. | 428/195 |
| 5,468,712 A | 11/1995 | Minato et al. | 503/227 |
| 5,500,274 A | 3/1996 | Francis et al. | 428/156 |
| 5,501,910 A | 3/1996 | Smith | 428/447 |
| 5,505,801 A | 4/1996 | Harris | 156/100 |
| 5,529,848 A | 6/1996 | D'errico | 428/413 |
| 5,529,849 A | 6/1996 | D'errico | 428/415 |
| 5,567,529 A | 10/1996 | Smith | 428/425.6 |
| 5,567,533 A | 10/1996 | Toney et al. | 428/475.5 |
| 5,595,794 A | 1/1997 | Cesar | 428/13 |
| 5,602,457 A | 2/1997 | Anderson et al. | 320/2 |
| 5,604,019 A | 2/1997 | Bland et al. | 428/212 |
| 5,631,089 A | 5/1997 | Center, Jr. et al. | 428/437 |
| 5,677,024 A | 10/1997 | Abe et al. | 428/40.1 |
| 5,756,171 A | 5/1998 | Moteki et al. | 428/36.6 |
| 5,756,186 A | 5/1998 | Lievens et al. | 428/195 |
| 5,759,653 A | 6/1998 | Collette et al. | 428/35.9 |
| 5,796,095 A | 8/1998 | Matsuyama et al. | 250/208.1 |
| 5,807,515 A * | 9/1998 | Fisher et al. | 264/135 |
| 5,882,774 A | 3/1999 | Jonza et al. | 428/212 |
| 5,922,424 A | 7/1999 | Igushi et al. | 428/35.9 |
| 5,932,239 A | 8/1999 | Horstmann et al. | 424/449 |
| 5,977,263 A * | 11/1999 | Phillips | 525/329.9 |
| 6,042,947 A | 3/2000 | Asakura et al. | 428/437 |
| 6,074,732 A | 6/2000 | Garnier et al. | 428/215 |
| 6,077,613 A | 6/2000 | Gaffigan | 428/442 |
| 6,080,467 A | 6/2000 | Weber et al. | 428/212 |
| 6,086,983 A | 7/2000 | Yoshizawa | 428/215 |
| 6,096,410 A | 8/2000 | Okajima et al. | 428/195 |
| 6,153,289 A * | 11/2000 | Murray | 428/201 |
| 6,235,374 B1 | 5/2001 | Miki et al. | 428/201 |
| 6,329,061 B2 | 12/2001 | Kondo | 428/432 |
| 6,372,352 B1 | 4/2002 | Bletsos et al. | 428/441 |

* cited by examiner

DIGITAL COLOR-DESIGN COMPOSITE FOR USE IN LAMINATED GLASS

BACKGROUND

There is significant commercial interest in the fabrication of customized glass laminates with encapsulated digitally printed images having vibrant colors for use in architectural and automotive applications. Because project delivery times for current methods of producing limited quantities of glass laminates with customized graphics can be very long with accompanying high costs, there is a strong market need for methods that will allow rapid turnaround time at reasonable cost.

Up to now options to create such laminates have been virtually limited to traditional screen printing methods involving the deposition of solvent based colored inks onto plastic substrates and subsequent encapsulation of the printed film in glass using multiple layers of adhesive. This screen printing process involves time consuming and costly preparation of multiple screens—one for each color separation. Issues related to the use of solvents must be managed in order to prevent environmental problems. In addition, the required setup and cleanup times result in a process that is not cost effective for limited quantities of printed film.

Introduction of digital methods such as inkjet printing seems like a natural fit for production of glass laminates with customized graphics. However, inkjet printing onto clear substrates suffers from the lack of visual quality due to the less than vibrant colors that are obtained. Most commercial uses of inkjet printing utilize opaque substrates such as white paper or white polyvinyl chloride film (white vinyl) for optimum appearance and when such printing is performed on clear print media such as polyester film, there is a significant loss in color vibrancy. Because of the high ink pigment loading and large pigment particle size that would be required to print more opaque, and hence more vibrant colors onto a clear film, it is not likely that this color issue will be easily resolved for ink jet printing. Inkjet printing onto high opacity media such as white polyester or vinyl might result in acceptable appearance with vibrant colors but the resulting glass laminate would have poor see-through characteristics and lose much of the desired aesthetic value.

Encapsulation of thermal transfer printed color images in glass laminates for customized applications provides the opportunity to deliver the desired laminate appearance. Thermal transfer color printing was developed in early 1980's and first used in commercial color printers for corporate office printing. In the mid-1990's inkjet printing technology became dominant because of its much lower cost. Thermal transfer printing is still broadly used today for numerous applications such as printing bar codes onto labels and tags.

Thermal transfer printing is a dry-imaging process that involves the use of a printhead containing many resistive heating elements that selectively transfer solid ink from a coated ribbon to a substrate. As the coated ribbon is transported through the print head, targeted areas of the ink layer are heated, softened and transferred to the substrate. The consumed ribbon is usually rewound and disposed.

The resolution of a typical thermal transfer printer is usually around 200–400 dpi with software capability to utilize variable dot shapes and screen angles so that output quality can be very high quality depending upon media used. Because the ink is not required to pass through a small nozzle in the printhead, larger pigment particles and greater pigment loadings can be used with thermal transfer printing to achieve the desired vibrancy of color. However, achieving acceptable quality on clear media is more challenging than opaque media and because there is little commercial activity in this area, the print media choices are limited which can also affect the quality.

One of the major advantages of thermal transfer printing is the minimal setup times required to produce an image which reduces the cost and turnaround time of a short run as compared to traditional screen printing operations.

There are numerous types of ink formulations used for thermal transfer print ribbons including those that are primarily wax, wax/resin or resin based. Resin based ribbons are usually more expensive and are primarily used for production of more durable images with the ability to withstand outdoor exposure for up to 3–5 years without lamination. Wax based ribbons are usually less expensive and used for less demanding applications.

Thermal transfer printing has been used for many years in the printing of bar codes on labels, tags, and tickets and the technology for production of these ribbons has become very specialized.

A typical color ribbon is a relatively complex composite structure that has been developed to provide for optimum performance in the thermal transfer printing process. A typical high performance thermal transfer color ribbon consists of a very thin biaxially oriented polyethylene terephthalate (PET) film substrate usually with a thickness of ~3–6 micrometers that acts as a carrier or support layer for the ink layer(s). PET film is selected as the preferred substrate because of its physical properties and ability to withstand print head temperatures of up to 120° C. This PET substrate is coated on one side with at least one thin layer of pigmented resin. With many resin based color ribbons there is also a release layer between the PET substrate and the pigmented ink layer to facilitate transfer of the ink layer to the print media. Such a release layer will end up on top of the image that in many applications will provide additional protection for the printed image. On the other side of the thin substrate is usually a "backcoating" that provides the correct frictional properties between the printhead and the ribbon.

U.S. Pat. No. 5,939,207, the contents of which are incorporated herein by reference, describes the composition of a four layer thermal transfer ribbon structure for use in the printing of black bar codes. With minor changes, this structure is thought to be representative of a typical color ribbon formulation utilized with the present invention. This structure described in the '207 Patent comprises a heat-resistant backcoat bonded to one side of a thermally and dimensionally stable substrate, such as PET film. An ultra thin release layer is provided on the other side of the substrate, with a pigmented layer then being provided on the release layer.

The pigmented layer contains carbon black and resin binder including polystryrene and polyacrylate resin with various functional groups such as methacrylic acid to promote adhesion to a variety of printing substrates. During printing, the pigmented layer is transferred to the print medium. Formulations for color ribbons used in applications requiring exterior durability will likely utilize a resin binder containing only polyacrylate resins and colored pigments with superior UV light stability. The formulation of the pigmented layer may also contain various waxes and other additives in order to achieve targeted viscosity and physical properties for optimum printing and coating performance.

In its final printed form, it is the release layer which if present functions as the top surface of the printed image. As described in the '207 Patent, the formulation of this layer contains components that provide for easy release of the pigmented layer from the substrate and may include such components as ethylene vinyl acetate copolymer, an—olefin maleic anhydride copolymer and various waxes such as Carnauba wax.

Thermal transfer printing offers various color options including the standard cyan, magenta, yellow and black (C-M-Y-K) process colors as well as a wide range of spot colors including white, metallics, fluorescents and specialized colors. The ability to print process colors onto either a clear substrate or on a white printed background provides the opportunity to generate a unique combination of vibrant colors and see-through laminate appearance that is not possible with inkjet printing.

Thermal transfer printing can be used to print images on a wide variety of substrates including PET, paper, vinyl, etc. Accurate color transfer during printing, ink/substrate adhesion and overall visual appearance are usually dependent upon the surface characteristics, such as surface smoothness of the print media. There are a number of companies, including Dunmore Corporation of Bristol, Pa. who supply print media for use with thermal transfer printing. Ribbon suppliers such as IIMAK/T2 Solutions of Amherst, N.Y. will usually provide lists of qualified media to customers. In many cases there is a proprietary or patented coating on the print surface of the substrate that provides for improved ink transfer characteristics. Warranty of outdoor color durability of the printed image by the ribbon supplier is usually dependent upon use of qualified media.

Recent advances in thermal printing technology include the introduction of lower cost and higher performance color ribbons with excellent outdoor durability. IIMAK of Amherst, N.Y. makes a line of high performance resin based color ribbons called DuraCoat® (DC-300 series).

For greater productivity, thermal transfer printing equipment, such as the Sprinter B Printer manufactured by Matan, Ltd./Israel, are designed with multiple print heads and ribbons. Use of multiple print heads and corresponding ribbons require the use of a substrate with high enough modulus so that color registration or misaligned color placement is not an issue. For example, qualified thermal transfer printing media such as white vinyl needs to be reinforced with a "backing" to minimize this issue. Commercial printers with width capabilities up to 132 cm are available.

In contrast to the traditional screen print approach for creation of vibrant colored images, the use of thermal transfer printing provides a very quick means to finished printed images. Use of digital image manipulation software such as Adobe's Photoshop® and/or Illustrator® in combination with the thermal transfer printer's raster image processing (RIP) software can complete a full project from design to finished proof in a matter of hours as compared to days or longer for the screen print process. This combination of thermal transfer printing and commercially available graphics software provides great opportunity for a wide range of customized aesthetics for use in laminated glass.

In glass laminate applications involving a glass/plasticized polyvinyl butyral (plasticized PVB)/glass combination, direct printing onto the plasticized PVB surface is not a viable option. The poor dimensional stability of plasticized PVB causes significant problems with color registration and poor appearance. Surface texture normally present on commercially available plasticized PVB interlayers for facilitating effective glass laminate processing also presents a significant problem in achieving acceptable appearance of the printed image. For these reasons accurate transfer of multiple colors onto plasticized PVB substrates has previously been found to be virtually impossible. It would thus be desirable to develop a laminate composite in which digital color images are printed onto a sufficiently rigid and smooth substrate which is then incorporated into the glass/plasticized PVB/glass laminate.

Dunmore Corporation produces a clear polyethylene terephthalate (PET) called Dun-Kote® DP38 film coated with its own proprietary coating specifically designed for thermal transfer printing. However, printing directly onto this substrate and subsequently incorporating the printed film into a glass laminate via encapsulation with two layers of plasticized PVB has been found to yield a laminate with inadequate structural integrity and with inconsistent printed image quality. These problems have been found to be the result of poor adhesion between the plasticized PVB and printed film component—both on the printed and unprinted surfaces as well as unacceptable interactions between the PVB plasticizer and the printed side of the PET film. It would thus be desirable to develop a laminate composite that provides a means for incorporation of digitally printed color images into glass/plasticized PVB/glass laminates for customized applications.

SUMMARY OF THE INVENTION

The intent of this invention is to achieve a glass laminate with an encapsulated digitally printed image that has overall performance characteristics including penetration resistance, optical quality and durability equivalent to a conventional glass/plasticized PVB/glass laminate. Because of the well recognized barrier characteristics of PET film, use of a second PET film component that is laminated to the printed PET film avoids any interaction between the PVB plasticizer and the print media coating or ink layers.

This invention is directed to a plastic composite comprising color images printed onto a polyethylene terephthalate (PET) substrate using thermal transfer printing technology. The PET layer is then bonded to a second PET layer using a thermally activated adhesive, preferably ethylene vinyl acetate copolymer (EVA). The bonded PET layers are then disposed between two layers of plasticized PVB, forming the plastic composite. The plastic composite can then be placed between two sheets of glass forming the final laminated glass product.

DETAILED DESCRIPTION OF ILLUSTRATED EMBODIMENTS

Figure 1:
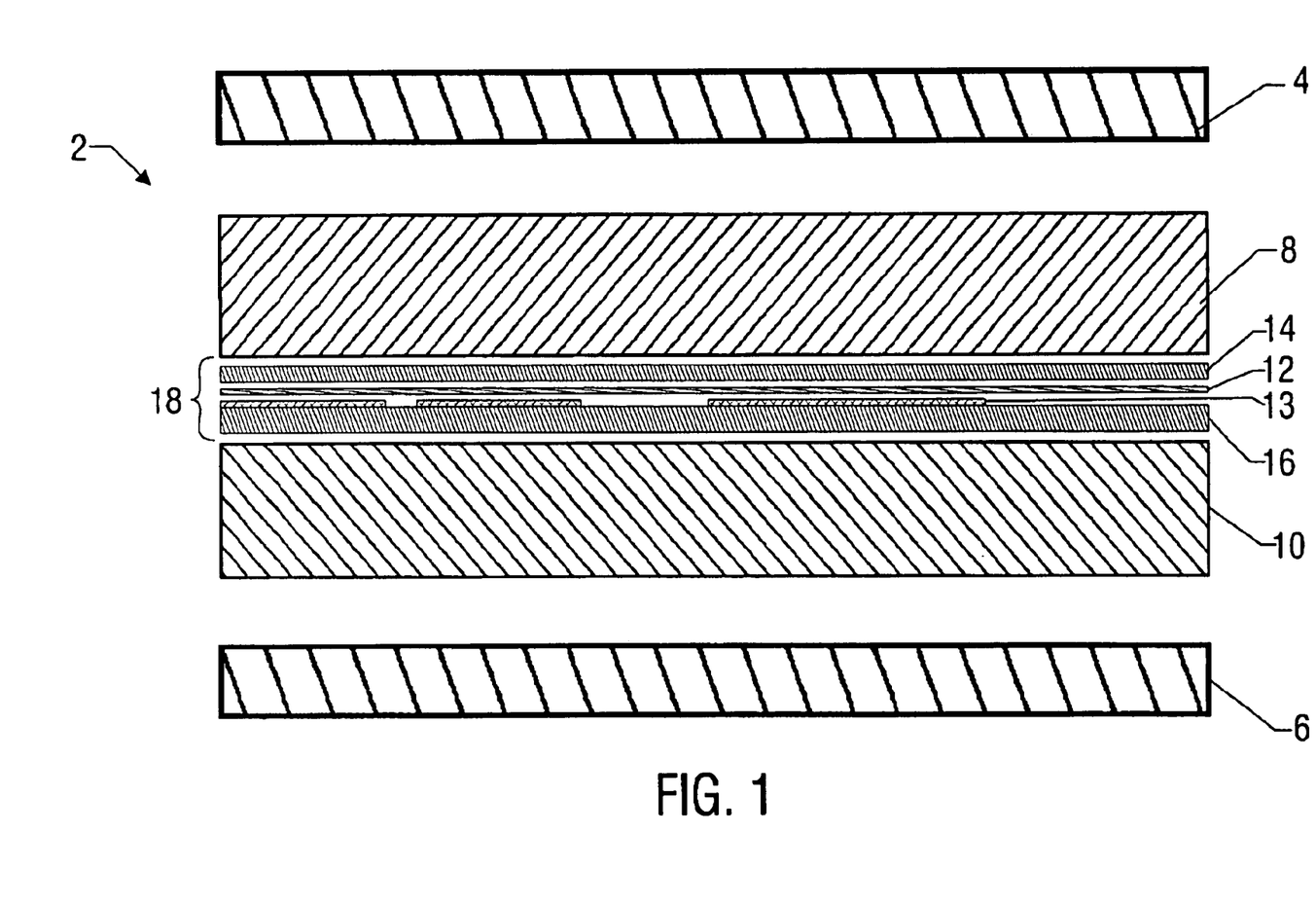
FIG. 1 shows one embodiment of the laminate of the present invention.

The invention disclosed herein describes an interlayer for use in glass laminates. One embodiment of the present invention is shown in FIG. 1. The interlayer (2) comprises a printed composite structure (18) that itself comprises a polymeric support film (16) having images (13) printed thereon bonded with an adhesive (12) to a protective polymeric film (14). This printed composite structure (18) is disposed between two adhesive layers (8, 10) to form the resultant interlayer (2). The interlayer can then be disposed between two sheets of glass (4, 6), thereby forming the final glass laminate product.

Thermal transfer printing technology is known in the art. In the present invention, an image is printed onto a first polymeric support film, preferably coated with a polymer film to improve its ink transfer characteristics. An image can be a logo, symbol, geometric pattern, photograph, alphanumeric characters or combinations thereof. The term "color" includes all colors as well as black and white.

The thickness of the polymeric support film is preferably 25 to 125 micrometers. The polymeric support film of the present invention should have properties to maintain its integrity during handling and deposition of the image onto its surface, as well as during subsequent bonding and laminating steps. Furthermore, the polymeric support film should have properties sufficient to be an integral part of the final safety-glazing product. To satisfy such performance requirements, the polymeric support film should be optically transparent (i.e. objects adjacent one side of the layer can be comfortably seen by the eye of a particular observer looking through the layer from the other side). The polymeric support film should usually have a greater, preferably significantly greater, tensile modulus than that of the outside adhesive layers.

Among thermoplastic materials having the desired physical properties for use as the polymeric support film are nylons, polyurethanes, polyacrylates, polyesters polycarbonates, cellulose acetates and triacetates, vinyl chloride polymers and copolymers and the like. Most preferred is polyethylene terephthalate (PET). Preferably, the PET is biaxially stretched to improve strength and is also heat stabilized to provide low shrinkage characteristics when subjected to elevated temperatures (i.e. less than 2% shrinkage in both directions after 30 minutes exposure at 150° C.). The tensile modulus (at 21–25° C.) of PET is about $10^{10}$ Pa as compared with about $10^7$ Pa for plasticized PVB of the type used in safety glazings.

Merely adhering the printed polymeric support film to two adhesive layers, such as plasticized polyvinyl butyral, such as is commonly done in the glass laminate industry, does not provide for a stable laminate composite structure though. The polyacrylate resin binder typically used for the ink layer of the thermal transfer ribbons has been shown to interact with common plasticizers used in commercially available plasticized PVB interlayers (glycol esters, adipate esters, etc.). This interaction will result in significant changes in laminate appearance and interply adhesion as well as compromises in long term laminate durability.

By introducing a polymeric film to cover the printed surface of the polymeric support film, which is very impervious to most of these common plasticizers, the interaction between the plasticized PVB and polyacrylate resin or any proprietary thermal transfer coating is virtually eliminated. This polymeric film preferably has a thickness of around 10 to 125 micrometers. If such a polymeric film is not used, it is also possible for there to be significant interactions between the proprietary coatings used on the thermal transfer print media and the adhesive layer. Similar consequences as those described in the preceding paragraph are possible and not desirable. One aspect of the present invention, though, is to achieve adequate adhesion between the polymeric film and the polymeric support film in order to achieve acceptable long term laminate integrity. In the preferred embodiment of the present invention, the polymeric film covering the printed surface is a second polymeric support film, such as a second PET layer. In another embodiment, the polymeric support film comprising the color image is coated with reactive mixture that is cured by ultraviolet light or heat to form a polymeric film that serves as the protective layer. Possible coatings could include epoxy, polyester, polyacrylate or polyurethane compositions. In another embodiment, the polymer film is coated with a water emulsion or solvent based polymer in which the water or solvent is removed to form a polymeric film. Possible coatings could include epoxy, polyester, polyacrylate or polyurethane compositions.

In the graphics industry use of an "overlay" film to provide protection of printed images is well known and practiced widely. The technology usually involves the use of a clear plastic film such as PET film coated with either a pressure activated acrylic adhesive or a heat activated adhesive such ethylene vinyl acetate copolymer. In the case of the PET overlay film with the pressure activated adhesive there is usually a silicone release liner mated to the adhesive surface which prevents blocking of the film in roll form and which must be removed prior to use.

With properly selected chemistry use of thermally activated adhesives commonly result in robust adhesion between PET layers. Use of ethylene vinyl acetate (EVA) copolymer provides acceptable peel and compressive shear adhesion properties that can result in excellent laminate integrity. Use of EVA copolymer adhesive will result in penetration resistance and other laminate performance properties that will be equivalent or superior to standard glass/plasticized PVB/glass laminates. Furthermore, the use of a thermally activated adhesive system to combine the PET-PET components is likely to provide for significant processing advantages over acrylic pressure sensitive adhesives, for example, during the manufacturing process of the plasticized PVB/PET-PET/plasticized PVB composite structure. With the use of a PET overlay film coated with a heat activated adhesive there is normally no need to provide a separate release liner if an adhesive with proper tacticity has been selected. Other thermally activated adhesives such as polyurethane thermoplastic adhesives can also be used as well.

While EVA copolymer/PET composites have been used extensively as protective overlays of printed materials which are combined using heat/pressure lamination, it is normally not used in the manufacture of glass laminates which require much longer (45–60 minutes vs. 10–20 seconds) and higher temperature (135° C. vs. 65–95° C.) processing conditions. For successful glass lamination the EVA copolymer adhesive composition (i.e. % vinyl acetate content) and thickness must be carefully selected in order to minimize haze formation caused by crystallization and less than optimum adhesion. Higher vinyl acetate content allows for greater adhesion between layers and lower haze levels. At vinyl acetate contents above 28% issues with roll blocking of the EVA/PET composite will cause processing difficulties during the overlay lamination step. Use of thinner layers of EVA and/or multi-layer co-extruded EVA structures can be used to achieve acceptable adhesion and haze results.

Typical heat/pressure laminating equipment as manufactured by companies such as General Binding Corporation are useful with the present invention. This type of equipment typically employs a supply roll of overlay film (heat activated adhesive+clear polymer film) that can be preheated using heated rolls or infra-red heating elements prior to combination with the printed film using nip roll pressure lamination. Such process equipment is normally configured with line speed, heating and nip roll pressure controls to provide for a resultant two ply laminate with excellent transparency which is indicative of no air entrapment between the layers and adequate flow of the adhesive.

As with the conventional use of this laminating technology in the graphic arts industry it is important to operate in a clean environment to minimize any contamination that might be entrapped between the polymeric support film and polymeric film and cause significant optical defects. Use of PET films with antistatic coatings is a preferred embodiment of the current invention and its value is derived from the reduction in airborne contamination and consequential improvement in optical quality.

After the printed polymeric support film is adhered to the second polymeric film, the combined structure is then disposed between two adhesive layers. Adhesive layers that can be utilized with the present invention include polyurethane, ethylene vinyl acetate copolymer, plasticized polyvinyl chloride as well as other elastomeric polymers with energy absorbing properties and surface chemistry to provide adequate adhesion to glass and the polymeric support film and polymeric film layers. The preferred adhesive layer of the present invention is plasticized PVB.

The outer surface layers of the combined polymeric support and polymeric films in contact with the adhesive layers must be appropriately coated and/or treated to achieve adequate adhesion and laminate integrity. Preferred techniques are chemical modification of the outer polymeric support and polymeric films by flame treatment, chemical oxidation, corona discharge, carbon sputtering, plasma treatment in vacuum or in air, application of an adhesive, or other treatments well known to those of ordinary skill in the art.

PVB resin is produced by known aqueous or solvent acetalization processes reacting PVOH with butyraldehyde in the presence of acid catalyst, followed by neutralization of the catalyst, separation, stabilization and drying of the resin. It is commercially available from Solutia, Inc. as Butvar® resin. PVB resin typically has a weight average molecular weight greater than 70,000, preferably about 100,000 to 250,000, as measured by size exclusion chromatography using low angle laser light scattering. On a weight basis PVB resin typically comprises less than 22%, preferably about 17 to 19% hydroxyl groups calculated as polyvinyl alcohol (PVOH); up to 10%, preferably 0 to 3% residual ester groups, calculated as polyvinyl ester, e.g. acetate, with the balance being acetal, preferably butyraldehyde acetal, but optionally including a minor amount of acetal groups other than butyral, for example 2-ethyl hexanal as disclosed in U.S. Pat. No. 5,137,954.

The PVB resin of the sheet is typically plasticized with about 15 to 50 and more commonly 25 to 45 parts plasticizer per hundred parts of resin. Plasticizers commonly employed are esters of a polybasic acid or a polyhydric alcohol. Suitable plasticizers are triethylene glycol di-(2-ethylbutyrate), triethyleneglycol di-(2-ethylhexanoate), tetraethyleneglycol diheptanoate, dihexyl adipate, dioctyl adipate, mixtures of heptyl and nonyl adipates, dibutyl sebacate, polymeric plasticizers such as the oil-modified sebacic alkyds, and mixtures of phosphates and adipates such as disclosed in U.S. Pat. No. 3,841,890 and adipates and alkyl benzyl phthalates as disclosed in U.S. Pat. No. 4,144,217. Also mixed adipates made from $C_4$ to $C_9$ alkyl alcohols and cyclo $C_4$ to $C_{10}$ alcohols as disclosed in U.S. Pat. No. 5,013,779. $C_6$ to $C_8$ adipate esters such as hexyl adipate are preferred plasticizers. A more preferred plasticizer is triethylene glycol di-(2-ethylhexanoate).

It is also desirable to incorporate a UV absorber into the plasticized PVB layers. One such UV absorber is disclosed in U.S. Pat. No. 5,618,863, the contents of which are incorporated herein by reference. The amount of UV absorber added to the plasticized PVB can vary and is generally from 0.1 to 1.0 part per 100 parts PVB polymer. Sandwiching the printed laminate composite between two plasticized PVB adhesive layers containing a UV absorber eliminates the need to include these expensive components in the PET print media or PET overlay film. Because almost all commercially available PET films do not contain UV absorbers, they are subject to significant UV degradation resulting in embrittlement of the film unless properly protected. In the preferred case when PET film is used for the printing media or overlay film, addition of UV absorber to the plasticized PVB layers is essential so that there is no degradation of the PET polymer. Furthermore, the addition of UV absorber in the plasticized PVB layers provides for improved light stability of the colorants in the printed layer. Alternatively, a UV absorber could be added to the PET or other selected polymeric support films.

In addition to plasticizer, UV absorber and adhesion control agent, the plasticized PVB layers may contain other performance enhancing additives such as pigments or dyes for coloring all or part of the sheet, antioxidants and the like. For example, one of the PVB layers could be a white color with low visible transmittance PVB layer which can increase the vibrancy of colors on the printed PET layer.

Plasticized PVB sheet at a non-critical thickness of about 0.38 to 1.5 mm is formed by mixing resin and plasticizer plus additives and preferably (in commercial systems) extruding the mixed formulation through a sheet die, i.e., forcing molten, plasticized PVB through a horizontally long vertically narrow die opening substantially conforming in size to the sheet being formed. Roughness of the surface of the sheet is usually produced through a phenomenon known to those skilled in the art as melt fracture and such desired characteristics can be derived by design of the extrudate die opening as shown, for example, in FIG. 4 of U.S. Pat. No. 4,281,980. Other known techniques for producing a rough surface on one or more sides of an extruding sheet involve specifying or controlling one of the following: polymer molecular weight distribution, water content and temperature of the melt. These techniques are disclosed in U.S. Pat. Nos. 2,904,844; 2,909,810; 3,994,654; 4,575,540 and European Patent No. 0185,863. Embossing of the sheet downstream of the die can also be used to produce the desired surface roughness. Examples of embossed plasticized PVB sheets with regular patterned surfaces are described in U.S. Pat. Nos. 5,425,977 and 5,455,103. This plasticized PVB surface roughness is needed to facilitate the de-airing of the glass/plasticized PVB interface and is completely eliminated during subsequent autoclave lamination. The final laminate of the present invention is formed using processes known in the art.

Figure 2:
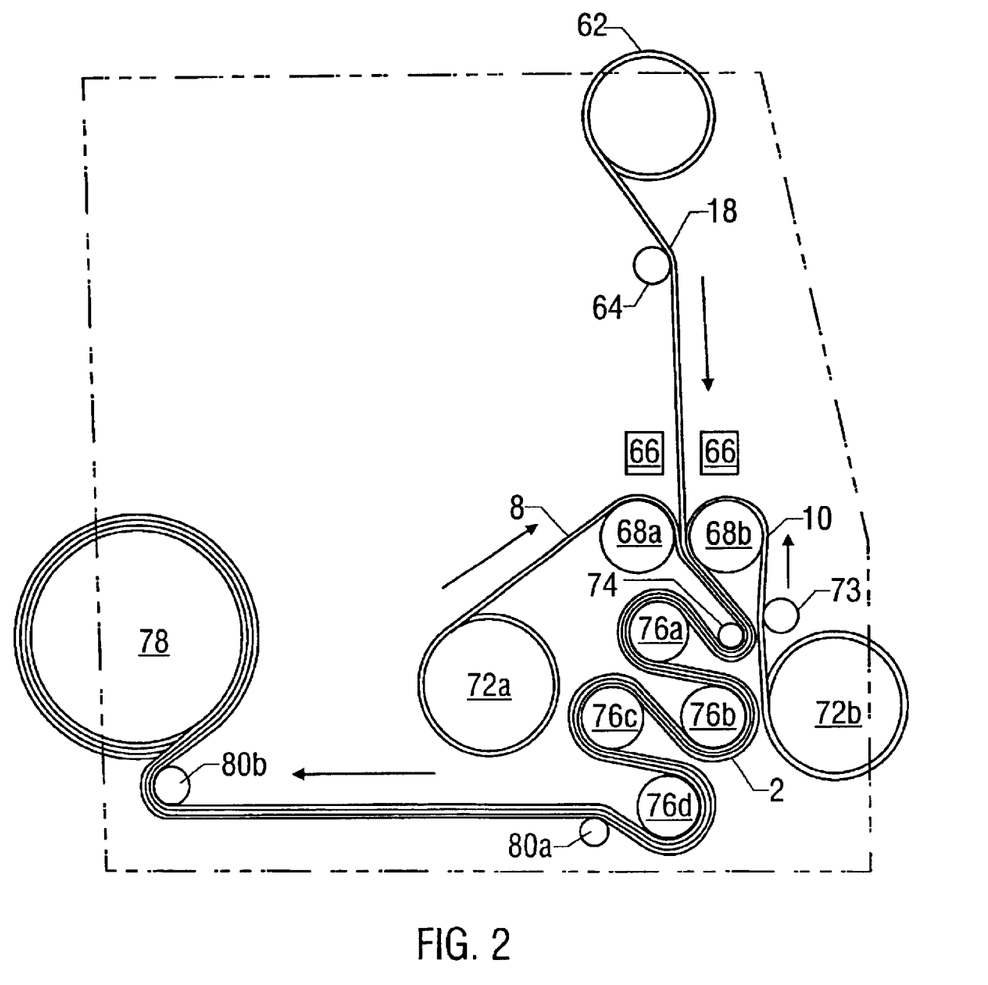
FIG. 2 is a nip-roll press bonding for forming plasticized PVB-PET-PET-plasticized PVB laminate.

Referring to FIG. 2, a process will be described for forming the full printed laminate composite 2 for use in a safety glazing such as a vehicle or building window, skylight, sunroof or the like. FIG. 2 illustrates a nip roll press-bonding system for encapsulating the printed laminate layer 18 within plasticized PVB layers 8 and 10. The printed laminate layer 18 from roll 62 is passed over tension roll 64 and subjected to moderate surface heating in stations 66 positioned to gently heat either printed laminate layer 18, plasticized PVB sheets 8 and 10, or both. Heating is to a temperature sufficient to promote temporary fusion bonding in that the thermally softened surfaces of layers 8 and 10 become tacky. When the polymeric support layers of printed laminate layer 18 are the preferred biaxially oriented polyethylene terephthalate, suitable temperatures are from about 30° C. to about 120° C., with the preferred surface temperature reaching about 50° C.

Printed laminate layer 18 and plasticized PVB layers 8 and 10, each having roughened de-airing surfaces, are directed into the laminating nip between oppositely rotating press rolls 68a, 68b where the three layers are merged together. This expels the air between the layers and this process step is critical because it is essential to remove as much air as possible from between the layers. The result of this merging is the encapsulation of printed laminate layer 18 within plasticized PVB layers 8 and 10 to form the lightly bonded laminate 2 of FIG. 1, without flattening the outer unbonded de-airing surfaces of layers 8 and 10. Layers 8 and 10 are supplied from rolls 72a, 72b and a tension roll 73 can be included in the plasticized PVB layer supply line. If desired, press rolls 68a, 68b can be optionally heated to promote bonding. Bonding pressure exerted by press rolls 68a, 68b can be varied depending on the carrier film material chosen and bonding temperature employed but generally will range from about 0.7 to 5 kg/sq cm, preferably about 1.8 to 2.1 kg/sq cm. The tension of laminate 2 is controlled by passage over idler roll 74. Typical line speeds through the FIG. 2 assembly are from 1.5 to 10 m/min).

The laminate of the present invention will most commonly be disposed between sheets of glass, preferably a pair of matching float glass sheets. The glass sheets can be any combination of any types of glass, including both clear glass and tinted glass, and including annealed, heat strengthened or tempered glass. The composite laminate of the present invention has the advantage that it can be used in the same manner and laminated employing the same equipment as that employed in forming conventional safety glass laminates, for example, process forming a safety glass laminate containing a single layer plasticized PVB safety film. The typical commercial safety glass lamination process comprises the following steps:

(1) hand assembly of the two pieces of glass and composite laminate;
(2) passing the assembly through a pressure nip roll at room temperature to expel trapped air;
(3) heating the assembly via IR radiant or convective means for a short period, typically until reaching a glass surface temperature of about 100° C.;
(4) passing the hot assembly through a second pair of nip rolls to give the assembly enough temporary adhesion to seal the edge of the laminate and allow further handling and
(5) autoclaving the assembly typically at temperatures between 130 to 150° C. and pressures between 1050 to 1275 kN/sq. m for about 30 to 90 minutes.

Other means for use in de-airing of the plasticized PVB/glass interfaces (steps 2–4) known in the art and are commercially practiced include vacuum bag and vacuum ring processes in which vacuum is utilized to remove the air.

Acceptable end use performance requirements of a glass laminate include maintenance of structural integrity (that is, no interfacial separations) when subjected to external forces such as those imposed by wind, temperature, etc. In addition, the nonplanarity of heat strengthened or tempered glass if used for the fabrication of glass laminates can result in a force that may result in the separation of one or more layers. For the preferred embodiment of the current invention there are at least six additional interfaces (e.g., plasticized PVB/PET, PET/thermal transfer coating, thermal transfer coating/ink layer, ink layer/EVA adhesive, EVA adhesive/PET, PET/plasticized PVB) as compared to a standard glass/plasticized PVB/glass laminate that need to be considered. In order to avoid issues with laminate integrity it is essential that the interfacial adhesion of all surfaces within a glass laminate meet a minimum requirement. Measurement of the compressive shear strength of a laminate provides an adhesion measurement of the weakest interface. This result can be used as means to determine laminate integrity and the potential for interfacial delamination during installed use.

Figure 3:
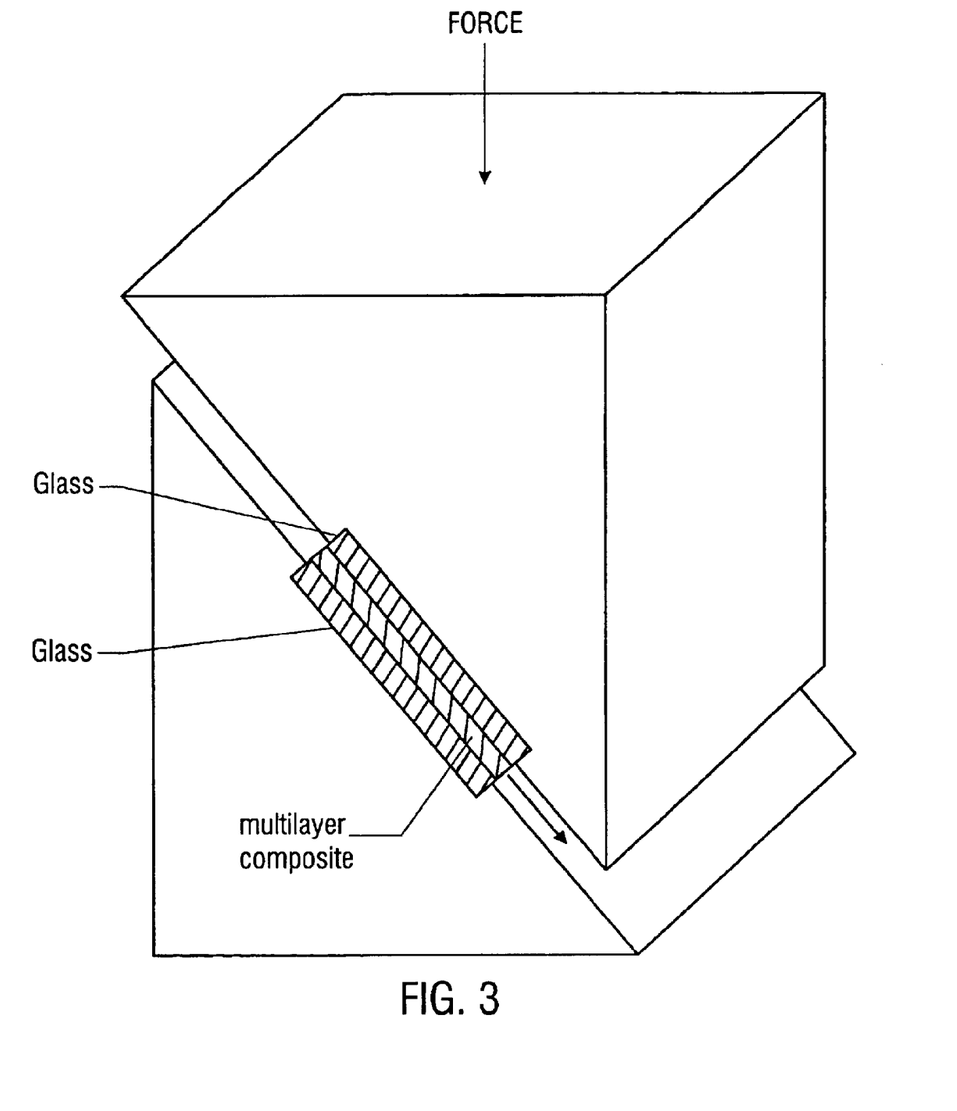
FIG. 3 is a cross sectional view of the test fixture used for compressive shear measurements.

The compressive shear strength of a laminate is measured using the test method outlined below and shown in FIG. 3. Glass laminates for evaluation are prepared using conventional lamination methods which have been described in a previous section. Thickness of the glass layers used for the laminates is selected such that during testing, the plastic/glass interfaces are able to move freely within the test fixture as shown in the FIG. 3. For each laminate type under evaluation a series of at least 6 circular test specimens with a diameter of 30 mm are cut from a larger piece of glass laminate using rotary diamond core drill with water cooling. Water cooling is adjusted to avoid excessive heating of the laminate and care is taken to minimize glass chipping. After the test specimens have been cut, they are conditioned overnight at 21 to 23° C. prior to testing.

To initiate the testing, the circular test specimen is placed into the recessed circular area of the stationary lower half of the test fixture after which the upper half of the test fixture is mated with the lower half. The assembled test fixture with loaded test specimen is then inserted into a testing apparatus such as an Alpha Technologies T20 Tensometer in which a crosshead can apply a measured force to the movable top surface of the test fixture. Once the crosshead makes contact with the top surface of the test fixture, the crosshead is moved at a constant rate of 3.2 mm/min and the maximum force required to shear the sample is determined. The interface at which failure occurs should be noted to identify the weakest interface. The measured force is then converted in compressive shear strength by dividing it by the cross-sectional area of the test specimen. Minimum compressive shear strength for laminates with adequate integrity has been estimated to be approximately 8 MPa.

The 90 degree peel adhesion test method measures the adhesive bond strength between plasticized PVB and PET film. Special test laminates (6.4 cm width×17.1 cm length) containing the PET film to be tested and Saflex® RB41 a commercially available plasticized PVB sheet from Solutia Inc. are prepared using modified laminating techniques previously described by substituting the PET test film for one glass piece of a standard glass/plasticized PVB/glass laminate. The thickness of the plasticized PVB layer is 0.76 mm. Glass thickness while not an important factor is usually in the range of 2.0 to 3.0 mm. Thickness of the PET to be tested ranges from 50–175 micrometers. In order to ensure that the adhesion between the glass and the plasticized PVB layer is greater than the adhesion between the PET and plasticized PVB layer, the plasticized PVB film is dried at 70° C. for one hour prior to assembly.

The glass/plasticized PVB/PET laminates are prepared by hand assembly of the individual components. It is also useful to insert a small (2.5 cm×6.4 cm) piece of thin piece (about 12 micrometers) PET film having very low adhesion to plasticized PVB between the plasticized PVB and PET layers at the point where the peel test specimen is scored and broken (see below) in order to facilitate the initial peeling process otherwise it may be difficult to initiate the separation of the plasticized PVB and PET layers.

Two such assembled laminates are then placed with PET surfaces in contact with each other and passed through deairing rolls that have the gap adjusted to apply a required amount of pressure and effectively expel excessive air located between the various layers. The laminates are then placed individually into a convection air oven at 105° C. for 10 minutes. The hot laminates are again coupled in pairs (with a paper separator if needed to avoid adhesion between the PET layers) and passed through the nip rolls as before. These laminates are then autoclaved at a pressure of 1275 kN/sq m using an autoclave cycle with a 20 minute hold time at 143° C.

After autoclaving is completed, two cuts parallel to the length of the laminate at a distance of 4 cm from each other are made through the PET layer only using a razor blade or other similar instrument. The surface is then scored on the glass side and broken parallel to width dimension of the laminate at a position approximately 4 cm from the end of the laminate. From the glass side of the laminate, a cut is made through the plasticized PVB layer at the glass break to allow the PET film to be peeled from the plasticized PVB layer. The outside edge of the PET film on each side of the 4 cm width strip is cut at the glass break. At least three samples for each PET film type are tested per reported value.

Before conducting the actual peel test, the samples are conditioned overnight at 21° C. During peel testing, the glass/plasticized PVB/PET test specimen is positioned in the grips of a peel tester (cross-head speed of 12.7 cm per min) which is configured to peel the PET film from the plasticized PVB surface at a 90 degree angle. The force necessary to separate the PET film from the plasticized PVB surface is measured and the average of the various recorded peaks is determined. Peel adhesion is then calculated by dividing the measured force by the 4 cm width of the test strip. Minimum peel adhesion for laminates with adequate integrity has been estimated to be approximately 4 N/cm, with preferred embodiments having a peel adhesion of about 8 N/cm.

When performing the five pound (2.27 kg) ball drop test, a series of glass laminates having dimensions of 30.5 cm×30.5 cm are prepared using standard autoclave lamination techniques described previously. At least 6 glass laminates, preferably 12 glass laminates are required to measure the penetration resistance. The prepared glass laminates are individually positioned in a support frame as described in the ANSI/SAE Z26.1 automotive test code. While at a constant temperature of 21° C.±2° C., a five pound (2.27 kg) spherical steel ball is dropped onto the center of the laminate from a specified height that will result in penetration of the laminate. Two spaced magnetic coils that are coupled and positioned beneath the test laminate measure the time for the steel ball to traverse the distance between the coils. This measured time is then converted into the ball velocity after lamination penetration. The velocity of the ball as it strikes the glass surface is also calculated. The loss in kinetic energy of the ball as it penetrates the laminate is then converted into break height. Measured Mean Break Height is the average break height in meters of at least 6 ball drops in which both glass laminate failure and ball penetration occurs.

Finally, laminate haze is measured following ASTM D1003-00 (Test Method for Haze and Luminous Transmittance/Procedure B) using a Byk-Gardner TCS Spectrophotometer.

EXAMPLES

Example 1

Dun-Kote® DP38- a 3 mil high clarity PET film manufactured by Dunmore Corporation of Bristol, Pa.—having a proprietary coating for improved performance with thermal transfer printing was adhesion promoted on the uncoated side via plasma treatment. Process conditions were employed during the plasma treatment so that the resultant 90 degree peel adhesion of this treated surface to Saflex® plasticized PVB interlayer (RB41) commercially available from Solutia Inc. after autoclave lamination was found to be 8 N/cm.

Example 2

A PET overlay film consisting of 1 mil layer of ethylene vinyl acetate copolymer containing 28% vinyl acetate was coated onto a 2.65 mil Hostaphan® 4707 PET film (commercially available from Mitsubishi Films, Greer, S.C.). The surface of the PET overlay film coated with the ethylene vinyl acetate copolymer was not tacky prior to use. The uncoated PET surface of this PET/EVA overlay film was plasma treated prior to coating. Testing of the 90 degree peel adhesion of the uncoated PET surface to standard Saflex® plasticized PVB (RB41) interlayer after autoclave lamination was found to be 12 N/cm.

Example 3

A digital test image was printed onto the coated surface film from Example 1 using the Matan Sprinter B printer and Duracoat® DC300 series C-M-Y-K ribbons supplied by T2 Solutions of Amherst, N.Y. The resultant test image showed excellent color and image detail.

Example 4

The EVA/PET overlay film of Example 2 was heat laminated to the printed PET film in Example 3 using a conventional heated roll/pressure nip process configuration. Process conditions were selected to achieve a final composite appearance with high transparency and no visible air entrapment.

Example 5

The printed test image of Example 3 was "hand" encapsulated with two layers of 0.38 mm standard Saflex® RB-11 plasticized PVB interlayer (commercially available from Solutia) and then laminated with two pieces of 2.3 mm annealed glass to form a finished glass laminate using conventional nip roll deair/hot tack and autoclave processing as described previously. Compressive shear adhesion were measured and found to be low (7 MPa) with failure observed at the ink/plasticized PVB interface. This low compressive shear adhesion is considered at an unacceptable level for overall glass laminate integrity. Significant changes in the visual appearance of the printed image were also observed after lamination and were considered unacceptable.

Example 6

The PET-PET composite of Example 4 was encapsulated with two layers of 0.38 mm standard Saflex® plasticized PVB interlayer (RB11) and then laminated with two pieces of 2.3 mm annealed glass to form a finished glass laminate using conventional nip roll deair/hot tack and autoclave processing. Both haze and compressive shear adhesion were measured and found to be within acceptable limits as shown below. No changes in the visual appearance or color of the printed images were observed after lamination.

| | |
|---|---|
| Haze | 1.4% |
| Compressive Shear | 12.3 MPa |

Mean Break Height (MBH) was tested using the 5 lb.ball drop test method and found to be greater than 7.6 m which is at least comparable to an equivalent glass/plasticized PVB/glass laminate.

The preceding description is set forth for purposes of illustration only and is not to be taken in a limited sense. Various modifications and alterations will be readily apparent to persons skilled in the art. It is intended, therefore, that the foregoing be considered as exemplary only and that the scope of the invention be ascertained from the following claims.

We claim:

1. An interlayer for laminated glass, the interlayer comprising a biaxially stretched polyethylene terephthalate polymeric support film containing at least one color image printed thereon; a biaxially stretched polyethylene terephthalate polymeric film bonded to the polymeric support film, such that the at least one color image is between the polymeric support film and the polymeric film; a first adhesive layer bonded to the polymeric support film opposite of the interface between the polymeric support film and the polymeric film; and a second adhesive layer bonded to the polymeric film opposite of the interface between the polymeric film and the polymeric support film.

2. The interlayer of claim 1, wherein the at least one color image is printed on the polymeric support film using thermal transfer printing technology.

3. An interlayer for laminated glass, the interlayer comprising a polymeric support film containing at least one color image printed thereon; a polymeric film bonded to the polymeric support film using a thermally activated adhesive, such that the at least one color image is between the polymeric support film and the polymeric film; a first adhesive layer bonded to the polymeric support film opposite of the interface between the polymeric support film and the polymeric film; and a second adhesive layer bonded to the polymeric film opposite of the interface between the polymeric film and the polymeric support film.

4. The interlayer of claim 3, wherein the thermally activated adhesive is ethylene vinyl acetate copolymer.

5. An interlayer for laminated glass, the interlayer comprising a polymeric support film containing at least one color image printed thereon; a polymeric film bonded to the polymeric support film with a minimum bond strength of 4 N/cm., such that the at least one color image is between the polymeric support film and the polymeric film; a first adhesive layer bonded to the polymeric support film opposite of the interface between the polymeric support film and the polymeric film; and a second adhesive layer bonded to the polymeric film opposite of the interface between the polymeric film and the polymeric support film.

6. The interlayer of claim 5, wherein the polymeric support film and polymeric film are bonded together with a bond strength of at least 8 N/cm.

7. An interlayer for laminated glass, the interlayer comprising a polymeric support film having a thickness of between about 25 to 125 micrometers containing at least one color image printed thereon; a polymeric film having a thickness of between about 10 to 125 micrometers bonded to the polymeric support film, such that the at least one color image is between the polymeric support film and the polymeric film; a first adhesive layer bonded to the polymeric support film opposite of the interface between the polymeric support film and the polymeric film; and a second adhesive layer bonded to the polymeric film opposite of the interface between the polymeric film and the polymeric support film.

8. The interlayer of claim 7, wherein the thickness of the polymeric support film is about 75 micrometers.

9. The interlayer of claim 7, wherein the thickness of the polymeric film is about 75 micrometers.

10. An interlayer for laminated glass, the interlayer comprising a polymeric support film containing at least one color image printed thereon; a polymeric film bonded to the polymeric support film, such that the at least one color image is between the polymeric support film and the polymeric film; a first adhesive layer bonded to the polymeric support film opposite of the interface between the polymeric support film and the polymeric film; and a second adhesive layer bonded to the polymeric film opposite of the interface between the polymeric film and the polymeric support film; wherein each of the first adhesive layer and second adhesive layer are selected from the group consisting of polyurethane, ethylene vinyl acetate copolymer, plasticized polyvinyl chloride and plasticized polyvinyl butyral.

11. The interlayer of claim 10, wherein each of the first adhesive layer and second adhesive layer are plasticized polyvinyl butyral.

12. The interlayer of claim 11, wherein the plasticized polyvinyl butyral is plasticized with a plasticizer selected from the group consisting of triethylene glycol di-(2-ethylbutyrate), triethyleneglycol di-(2-ethylhexanoate), tetraethyleneglycol diheptanoate, dihexyl adipate, dioctyl adipate, mixtures of heptyl and nonyl adipates, dibutyl sebacate, polymeric plasticizers, and mixtures of phosphates and adipates, mixtures of adipates and alkyl benzyl phthalates, mixed adipates made from $C_4$ to $C_9$ alkyl alcohols and cyclo $C_4$ to $C_{10}$ alcohols, $C_6$ to $C_8$ adipate esters, and mixtures thereof.

13. An interlayer for laminated glass, the interlayer comprising a polymeric support film containing at least one color image printed thereon; a polymeric film bonded to the polymeric support film, such that the at least one color image is between the polymeric support film and the polymeric film; a first adhesive layer bonded to the polymeric support film opposite of the interface between the polymeric support film and the polymeric film; and a second adhesive layer bonded to the polymeric film opposite of the interface between the polymeric film and the polymeric support film; wherein one or both of the adhesive layers comprise an ultra-violet light absorber.

14. An interlayer for laminated glass, the interlayer comprising a polymeric support film containing at least one color image printed thereon; a polymeric film bonded to the polymeric support film, such that the at least one color image is between the polymeric support film and the polymeric film; a first adhesive layer bonded to the polymeric support film opposite of the interface between the polymeric support film and the polymeric film; and a second adhesive layer bonded to the polymeric film opposite of the interface between the polymeric film and the polymeric support film; wherein the polymeric support film comprises an ultra-violet light absorber.

15. An interlayer for laminated glass, the interlayer comprising a polymeric support film containing at least one color image printed thereon; a polymeric film bonded to the polymeric support film, such that the at least one color image is between the polymeric support film and the polymeric film; a first adhesive layer bonded to the polymeric support film opposite of the interface between the polymeric support film and the polymeric film; and a second adhesive layer bonded to the polymeric film opposite of the interface between the polymeric film and the polymeric support film; wherein one or both of the adhesive layers are colored.

16. An interlayer for laminated glass, the interlayer comprising a polymeric support film containing at least one color image printed thereon; a polymeric film bonded to the polymeric support film, such that the at least one color image is between the polymeric support film and the polymeric film; a first adhesive layer bonded to the polymeric support film opposite of the interface between the polymeric support film and the polymeric film; and a second adhesive layer bonded to the polymeric film opposite of the interface between the polymeric film and the polymeric support film; wherein the first and the second adhesive layers have a thickness of about 0.38 to 1.5 mm.

17. An interlayer for laminated glass, the interlayer comprising a polymeric support film containing at least one color image printed thereon; a polymeric film bonded to the polymeric support film, such that the at least one color image is between the polymeric support film and the polymeric film; a first adhesive layer bonded to the polymeric support film opposite of the interface between the polymeric support film and the polymeric film; and a second adhesive layer bonded to the polymeric film opposite of the interface between the polymeric film and the polymeric support film; wherein the surfaces of the polymeric support film and the polymeric film in contact with the adhesive layers are chemically modified using a process selected from the group consisting of flame treatment, chemical oxidation, corona discharge, carbon sputtering, plasma treatment in vacuum, and plasma treatment in air.

18. An interlayer for laminated glass, the interlayer comprising a polymeric support film containing at least one color image printed thereon; a polymeric film bonded to the polymeric support film, such that the at least one color image is between the polymeric support film and the polymeric film; a first adhesive layer bonded to the polymeric support film opposite of the interface between the polymeric support film and the polymeric film; and a second adhesive layer bonded to the polymeric film opposite of the interface between the polymeric film and the polymeric support film; wherein an adhesive is applied between the surfaces of the polymeric support film and polymeric film in contact with the adhesive layers.

19. A laminated glass composite comprising an interlayer disposed between two glass sheets, the interlayer comprising a polymeric support film containing at least one color image printed thereon; a polymeric film bonded to the polymeric support film, such that the at least one color image is between the polymeric support film and the polymeric film; a first adhesive layer bonded to the polymeric support film opposite of the interface between the polymeric support film and the polymeric film; and a second adhesive layer bonded to the polymeric film opposite of the interface between the polymeric film and the polymeric support film; wherein the two glass sheets are a pair of matching float glass sheets.

20. A laminated glass composite comprising an interlayer disposed between two glass sheets, the interlayer comprising a polymeric support film containing at least one color image printed thereon; a polymeric film bonded to the polymeric support film, such that the at least one color image is between the polymeric support film and the polymeric film; a first adhesive layer bonded to the polymeric support film opposite of the interface between the polymeric support film and the polymeric film; and a second adhesive layer bonded to the polymeric film opposite of the interface between the polymeric film and the polymeric support film; wherein both the polymeric support film and the polymeric film are biaxially stretched polyethylene terephthalate.

21. A laminated glass composite comprising an interlayer disposed between two glass sheets, the interlayer comprising a polymeric support film containing at least one color image printed thereon; a polymeric film bonded to the polymeric support film, such that the at least one color image is between the polymeric support film and the polymeric film; a first adhesive layer bonded to the polymeric support film opposite of the interface between the polymeric support film and the polymeric film; and a second adhesive layer bonded to the polymeric film opposite of the interface between the polymeric film and the polymeric support film; wherein the polymeric support film is bonded to the polymeric film using a thermally activated adhesive.

22. The laminated glass composite of claim 21, wherein the thermally activated adhesive is ethylene vinyl acetate copolymer.

23. A laminated glass composite comprising an interlayer disposed between two glass sheets, the interlayer comprising a polymeric support film containing at least one color image printed thereon; a polymeric film bonded to the polymeric support film, such that the at least one color image is between the polymeric support film and the polymeric film; a first adhesive layer bonded to the polymeric support film opposite of the interface between the polymeric support film and the polymeric film; and a second adhesive layer bonded to the polymeric film opposite of the interface between the polymeric film and the polymeric support film; wherein the polymeric support film and polymeric film are bonded together with a minimum bond strength of 4 N/cm.

24. A laminated glass composite comprising an interlayer disposed between two glass sheets, the interlayer comprising a polymeric support film containing at least one color image printed thereon; a polymeric film bonded to the polymeric support film, such that the at least one color mane is between the polymeric support film and the polymeric film; a first adhesive layer bonded to the polymeric support film opposite of the interface between the polymeric support film and the polymeric film; and a second adhesive layer bonded to the polymeric film opposite of the interface between the polymeric film and the polymeric support film; wherein the polymeric support film and polymeric film are bonded together with a bond strength of at least 8 N/cm.

25. A laminated glass composite comprising an interlayer disposed between two glass sheets, the interlayer comprising a polymeric support film containing at least one color image printed thereon; a polymeric film bonded to the polymeric support film, such that the at least one color image is between the polymeric support film and the polymeric film; a first adhesive layer bonded to the polymeric support film opposite of the interface between the polymeric support film and the polymeric film; and a second adhesive layer bonded to the polymeric film opposite of the interface between the polymeric film and the polymeric support film; wherein the thickness of the polymeric support film is between about 25 to 125 micrometers and the polymeric film is between about 10 to 125 micrometers.

26. The laminated glass composite of claim 25, wherein the thickness of the polymeric support film is about 75 micrometers.

27. The laminated glass composite of claim 25, wherein the thickness of the polymeric film is about 75 micrometers.

28. A laminated glass composite comprising an interlayer disposed between two glass sheets, the interlayer comprising a polymeric support film containing at least one color image printed thereon; a polymeric film bonded to the polymeric support film, such that the at least one color image is between the polymeric support film and the polymeric film; a first adhesive layer bonded to the polymeric support film opposite of the interface between the polymeric support film and the polymeric film; and a second adhesive layer bonded to the polymeric film opposite of the interface between the polymeric film and the polymeric support film; wherein each of the first adhesive layer and second adhesive layer is selected from the group consisting of polyurethane, ethylene vinyl acetate copolymer, plasticized polyvinyl chloride and plasticized polyvinyl butyral.

29. The laminated glass composite of claim 28, wherein each of the first adhesive layer and second adhesive layer is plasticized polyvinyl butyral.

30. The laminated glass composite of claim 29, wherein the plasticized polyvinyl butyral is plasticized with a plasticizer selected from the group consisting of triethylene glycol di-(2-ethylbutyrate), triethyleneglycol di-(2-ethylhexanoate), tetraethyleneglycol diheptanoate, dihexyl adipate, dioctyl adipate, mixtures of heptyl and nonyl adipates, dibutyl sebacate, polymeric plasticizers, and mixtures of phosphates and adipates, mixtures of adipates and alkyl benzyl phthalates, mixed adipates made from $C_4$ to $C_9$ alkyl alcohols and cyclo $C_4$ to $C_{10}$ alcohols, $C_6$ to $C_8$ adipate esters, and mixtures thereof.

31. A laminated glass composite comprising an interlayer disposed between two glass sheets, the interlayer comprising a polymeric support film containing at least one color image printed thereon; a polymeric film bonded to the polymeric support film, such that the at least one color image is between the polymeric support film and the polymeric film; a first adhesive layer bonded to the polymeric support film opposite of the interface between the polymeric support film and the polymeric film; and a second adhesive layer bonded to the polymeric film opposite of the interface between the polymeric film and the polymeric support film; wherein one or both of the adhesive layers comprise an ultra-violet light absorber.

32. A laminated glass composite comprising an interlayer disposed between two glass sheets, the interlayer comprising a polymeric support film containing at least one color image printed thereon; a polymeric film bonded to the polymeric support film, such that the at least one color image is between the polymeric support film and the polymeric film; a first adhesive layer bonded to the polymeric support film opposite of the interface between the polymeric support film and the polymeric film; and a second adhesive layer bonded to the polymeric film opposite of the interface between the polymeric film and the polymeric support film; wherein the polymeric support film comprises an ultra-violet light absorber.

33. A laminated glass composite comprising an interlayer disposed between two glass sheets, the interlayer comprising a polymeric support film containing at least one color image printed thereon; a polymeric film bonded to the polymeric support film, such that the at least one color image is between the polymeric support film and the polymeric film; a first adhesive layer bonded to the polymeric support film opposite of the interface between the polymeric support film and the polymeric film; and a second adhesive layer bonded to the polymeric film opposite of the interface between the polymeric film and the polymeric support film; wherein one or both of the adhesive layers are colored.

34. A laminated glass composite comprising an interlayer disposed between two glass sheets, the interlayer comprising a polymeric support film containing at least one color image printed thereon; a polymeric film bonded to the polymeric support film, such that the at least one color image is between the polymeric support film and the polymeric film; a first adhesive layer bonded to the polymeric support film opposite of the interface between the polymeric support film and the polymeric film; and a second adhesive layer bonded to the polymeric film opposite of the interface between the polymeric film and the polymeric support film; wherein the first and the second adhesive layers have a thickness of about 0.38 to 1.5 mm.

35. A laminated glass composite comprising an interlayer disposed between two glass sheets, the interlayer comprising a polymeric support film containing at least one color image printed thereon; a polymeric film bonded to the polymeric support film, such that the at least one color image is between the polymeric support film and the polymeric film; a first adhesive layer bonded to the polymeric support film opposite of the interface between the polymeric support film and the polymeric film; and a second adhesive layer bonded to the polymeric film opposite of the interface between the polymeric film and the polymeric support film; wherein the surfaces of the polymeric support film and the polymeric film in contact with the adhesive layers are chemically modified using a process selected from the group consisting of flame treatment, chemical oxidation, corona discharge, carbon sputtering, plasma treatment in vacuum, and plasma treatment in air.

36. A laminated glass composite comprising an interlayer disposed between two glass sheets, the interlayer comprising a polymeric support film containing at least one color image printed thereon; a polymeric film bonded to the polymeric support film, such that the at least one color image is between the polymeric support film and the polymeric film; a first adhesive layer bonded to the polymeric support film opposite of the interface between the polymeric support film and the polymeric film; and a second adhesive layer bonded to the polymeric film opposite of the interface between the polymeric film and the polymeric support film; wherein an adhesive is applied between the surfaces of the polymeric support film and polymeric film in contact with the adhesive layers.

37. A laminated glass composite comprising an interlayer disposed between two glass sheets, the interlayer comprising a polymeric support film containing at least one color image printed thereon using thermal transfer printing technology; a polymeric film bonded to the polymeric support film, such that the at least one color image is between the polymeric support film and the polymeric film; wherein both the polymeric support film and the polymeric film are biaxially stretched polyethylene terephthalate.

38. A laminated glass composite comprising an interlayer disposed between two glass sheets, the interlayer comprising a polymeric support film containing at least one color image printed thereon using thermal transfer printing technology; a polymeric film bonded to the polymeric support film, such that the at least one color image is between the polymeric support film and the polymeric film; wherein the polymeric support film is bonded to the polymeric film using ethylene vinyl acetate copolymer thermally activated adhesive.

39. A laminated glass composite comprising an interlayer disposed between two glass sheets, the interlayer comprising a polymeric support film containing at least one color image printed thereon using thermal transfer printing technology; a polymeric film bonded to the polymeric support film, such that the at least one color image is between the polymeric support film and the polymeric film; wherein the polymeric support film and polymeric film are bonded together with a minimum bond strength of 4 N/cm.

40. A laminated glass composite comprising an interlayer disposed between two glass sheets, the interlayer comprising a polymeric support film containing at left one color image printed thereon using thermal transfer printing technology; a polymeric film bonded to the polymeric support film, such that the at least one color image is between the polymeric support film and the polymeric film; wherein the polymeric support film and polymeric film are bonded together with a bond strength of at least 8 N/cm.

41. A laminated glass composite comprising an interlayer disposed between two glass sheets, the interlayer comprising a polymeric support film containing at least one color image printed thereon using thermal transfer printing technology; a polymeric film bonded to the polymeric support film, such that the at least one color image is between the polymeric support film and the polymeric film; wherein the thickness of the polymeric support film is between about 25 to 125 micrometers and the polymeric film is between about 10 to 125 micrometers.

42. The interlayer of claim 41, wherein the thickness of the polymeric support film is about 75 micrometers.

43. The interlayer of claim 42, wherein the thickness of the polymeric film is about 75 micrometers.

44. A laminated glass composite comprising an interlayer disposed between two glass sheets, the interlayer comprising a polymeric support film containing at least one color image printed thereon using thermal transfer printing technology; a polymeric film bonded to the polymeric support film, such that the at least one color image is between the polymeric support film and the polymeric film; wherein one or both of the polymeric support film and the polymeric film comprise an ultra-violet light absorber.

45. An interlayer for laminated glass, the interlayer comprising a polymeric support film containing at least one color image printed thereon; a polymeric film bonded to the polymeric support film, such that the at least one color image is between the polymeric support film and the polymeric film; a first adhesive layer bonded to the polymeric support film opposite of the interface between the polymeric support film and the polymeric film; and a second adhesive layer bonded to the polymeric film opposite of the interface between the polymeric film and the polymeric support film; wherein the polymeric film comprises an ultra-violet light absorber.

46. A laminated glass composite comprising an interlayer disposed between two glass sheets, the interlayer comprising a polymeric support film containing at least one color image printed thereon; a polymeric film bonded to the polymeric support film, such that the at least one color image is between the polymeric support film and the polymeric film; a first adhesive layer bonded to the polymeric support film opposite of the interface between the polymeric support film and the polymeric film; and a second adhesive layer bonded to the polymeric film opposite of the interface between the polymeric film and the polymeric support film; wherein the polymeric film comprises an ultra-violet light absorber.

* * * * *